P. G. GARDINER.
RAILWAY CAR SPRING.
No. 93,984. Patented Aug. 24, 1869.
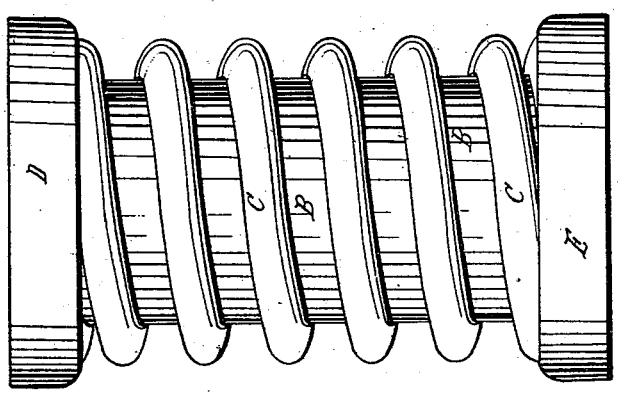
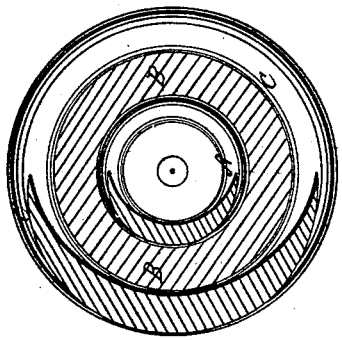
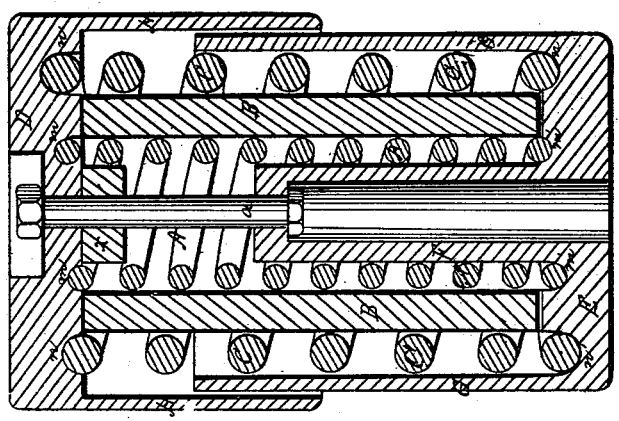
Witnesses Inventor.

United States Patent Office.

PERRY G. GARDINER, OF NEW YORK, N. Y.

Letters Patent No. 93,984, dated August 24, 1869.

IMPROVED RAILWAY-CAR SPRING.

The Schedule referred to in these Letters Patent and making part of the same.

*To all whom it may concern:*

Be it known that I, PERRY G. GARDINER, of the city, county, and State of New York, have invented a new and useful improvement upon the compound rubber and spiral steel spring, and which improvement I call the Union Spring.

My improvement consists in the device and application of a hollow central stud or tube, placed within the open core of the central rubber cylinder, and united fast with the cap or base of the spring, or playing through both, in combination with the compound rubber and spiral steel spring, the object of which is to give support to the spring and provide against leaning or bending out of line, and which is useful in the spring when placed vertically, and almost indispensable when such springs are used as buffers.

The nature of the spring, to which my improvement applies, is shown in the drawings accompanying this, my specification—

Figure I being a vertical cross-section of such spring, with a casing on the outside.

Figure II, an outside view or side elevation, and having no case.

Figure III, a horizontal cross-section of Fig. I.

The spring here shown represents (excepting the central tube or fixed stud) the well-known combination of the hollow India-rubber cylinder B, round which, on the exterior surface, is the steel spiral spring C, and on the interior surface, the spiral spring A, with cover D and base E.

As to this construction of the spring I make no claim; but my improvement consists in the hollow stud or tube F, fast to the base E, as shown in Fig. I, and extending through the spring and through the cap D, when used as a buffer; or, when used as a vertical car-spring, the central stud need not extend the entire height of the spring, but may be united with a bolt, *a*, passing through the head of F, and having on its end a nut. In either case, the parts of the spring are held together by the central stud or stud and bolt united.

The support which this central hollow stud, united with either cap or base, or both, affords the spring, greatly increases the strength and durability of this well-known combination of rubber and spiral spring, by preventing its leaning or squatting sidewise, as it is termed, and in the case of its use as a buffer-spring, the tendency to sag or bend, from its being in a horizontal position, is obviated, and it admits, also, the central bolt to pass entirely through it; and, at the same time, allows the action of the spring or buffer, whether merely compressed or used also as a draw-spring.

What I claim as my invention, therefore, is—

The device of the central hollow stud or tube F, combined with the rubber cylinder-spring B, and the spirally-coiled steel springs C and A, arranged and operating in the manner and for the purpose described.

P. G. GARDINER.

Witnesses:
C. R. WAGNER,
HENRY E. ROEDER.